(12) United States Patent
Yasuna et al.

(10) Patent No.: US 8,873,183 B2
(45) Date of Patent: Oct. 28, 2014

(54) DISK DRIVE AND METHOD OF WRITING SERVO WRITE TRACKS TO A DISK

(75) Inventors: Kei Yasuna, Kanagawa (JP); Tomoo Ozaki, Kanagawa (JP); Makoto Takase, Kanagawa (JP); Takao Horiguchi, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 994 days.

(21) Appl. No.: 12/963,580

(22) Filed: Dec. 8, 2010

(65) Prior Publication Data

US 2011/0141599 A1 Jun. 16, 2011

(30) Foreign Application Priority Data

Dec. 12, 2009 (JP) ................................. 2009-282322

(51) Int. Cl.
*G11B 5/596* (2006.01)

(52) U.S. Cl.
CPC ........ *G11B 5/59633* (2013.01); *G11B 5/59672* (2013.01); *G11B 5/59666* (2013.01)
USPC ............................................. 360/55; 360/75

(58) Field of Classification Search
None
See application file for complete search history.

(56) References Cited

U.S. PATENT DOCUMENTS

| | | | |
|---|---|---|---|
| 5,612,833 A | 3/1997 | Yarmchuk et al. | |
| 6,476,995 B1 * | 11/2002 | Liu et al. | 360/75 |
| 6,522,488 B2 * | 2/2003 | Sasamoto et al. | 360/75 |
| 6,628,471 B1 * | 9/2003 | Min et al. | 360/75 |
| 6,674,593 B2 * | 1/2004 | Jolly et al. | 360/75 |
| 6,721,120 B2 * | 4/2004 | Min et al. | 360/75 |
| 6,775,083 B2 * | 8/2004 | Hilla et al. | 360/51 |
| 6,785,073 B2 * | 8/2004 | Min et al. | 360/77.04 |
| 6,904,010 B1 * | 6/2005 | Kuroba et al. | 360/77.04 |
| 6,934,103 B2 * | 8/2005 | Chickanosky et al. | 360/75 |
| 6,937,414 B2 * | 8/2005 | Chickanosky | 360/75 |
| 6,970,320 B2 | 11/2005 | Sugiyama et al. | |
| 7,233,453 B2 * | 6/2007 | Harada et al. | 360/75 |
| 7,486,467 B2 * | 2/2009 | Sai et al. | 360/75 |
| 7,532,424 B2 * | 5/2009 | Sai et al. | 360/75 |
| 7,646,557 B2 * | 1/2010 | Brady et al. | 360/75 |
| 7,646,561 B2 | 1/2010 | Takasaki et al. | |
| 7,733,588 B1 * | 6/2010 | Ying | 360/51 |
| 8,000,049 B2 * | 8/2011 | Vanlaanen et al. | 360/51 |
| 8,089,718 B2 * | 1/2012 | Dunn | 360/75 |
| 2002/0030920 A1 * | 3/2002 | Min et al. | 360/75 |

FOREIGN PATENT DOCUMENTS

| | | |
|---|---|---|
| JP | 08212733 | 8/1996 |
| JP | 11019309 | 1/1999 |
| JP | 2004055090 | 2/2004 |
| JP | 2007149257 | 6/2007 |
| JP | 2008052807 | 3/2008 |

* cited by examiner

*Primary Examiner* — Wayne Young
*Assistant Examiner* — James L Habermehl (57) ABSTRACT

A system and method of writing servo write tracks to a rotating disk using a head having a read/write offset is disclosed. One embodiment utilizes a write element on the head to write the servo write tracks. A read element on the head is then positioned over the servo write tracks. The phase of a specific frequency component of the track shape error in the servo write track is measured during the positioning of the read element over the servo write track. A sine wave having a specific frequency and a phase is selected based on the measurement results. The sine wave is then applied to a servo system as a correction signal. A new servo write track is then written with the write element.

14 Claims, 7 Drawing Sheets

FIG. 7

DISK DRIVE AND METHOD OF WRITING SERVO WRITE TRACKS TO A DISK

CROSS-REFERENCE TO RELATED APPLICATION

This application claims priority from the Japanese Patent Application No. 2009-282322, filed Dec. 12, 2009, the disclosure of which is incorporated herein in its entirety by reference.

TECHNICAL FIELD

Embodiments of the present invention relate to a hard-disk drive (HDD which writes servo write tracks to a rotating disc and to a correction to servo control when writing in servo write tracks.

BACKGROUND

In general, one or more of the magnetic disks used in a hard disk drive (HDD) is provided with a plurality of data tracks and a plurality of servo tracks. Each servo track includes a plurality of servo sectors having address data. Moreover, each data track includes a plurality of data sectors containing user data. Data tracks are recorded between servo sectors separated in the circumferential direction.

The HDD is provided with an oscillating actuator, and a head slider is supported on this actuator. The HDD reads out the address data of the servo sector using the head slider, and controls the actuator with this address data. As such the HDD is able to move the head slider to the proper radial position, and then position the head there. Once positioned on the target data track, the head slider reads out data or writes in data to the target data sector within this track.

In the data readout process, signals read out from the magnetic disk by the head slider are subject to the designated signal processing such as waveform shaping or decryption by the signal processing circuit, and transferred to the host. Data transferred from the host is written into the magnetic disk by the head slider after receiving the designated processing by the signal processing circuit in the same way.

As described above, control of the positioning of the head slider is carried out using servo data on the magnetic disk. The servo sector includes the cylinder ID, sector number, burst pattern and the like. The cylinder ID indicates the track address while the sector number indicates the sector address within the track. The burst pattern has data on the position of the magnetic head relative to the track. The servo track is comprised of a plurality of servo sectors separated in the circumferential direction, and sectors which span all the servo tracks have their positions aligned in the circumferential direction.

Servo data are written into the magnetic disk in the factory before the HDD is shipped as a product. At present the process of writing in the servo tracks occupies a significant part of the manufacturing cost of the HDD. Self-servo writing (SSW) uses the mechanical mechanism of the HDD itself as a mechanism for servo writing, controlling the spindle motor and the voice coil motor within the HDD from an external circuit using the external circuit to write in the servo patterns. This enables the servo track writer (STW) to be eliminated, contributing to a reduction in HDD manufacturing costs.

SSW uses the fact that the positions of the read element and write element in the head element unit differ in the radial direction. This separation is known as the read/write offset.

Thus the self-propagation of servo sectors into which new tracks are written presumes that the precision of the servo sectors read out in the radial direction will be carried on unchanged in the new newly written servo sectors. However, due to various factors that cause errors to occur, this precision deteriorates in the process of propagation. Deterioration in the precision of positioning causes discrepancies in the proper position for a servo sector, and this is carried on in subsequent propagations.

Moreover, this process also depends on the characteristics of the servo loop that enables the head element unit to execute track following. Deterioration in precision is a complex mechanism involving a number of factors. In this way track shape errors accumulate in regions with frequencies where the gain of the closed loop transfer characteristics exceeds 1 due to repeated propagation and writing operations during SSW.

With conventional techniques, the operation control program has to measure and model the closed loop characteristics for the servo system in advance. However, the actual transmission characteristics for the magnetic disk differ slightly due to a variety of causes. As a result, there can be a discrepancy in characteristics between the servo system model and the actual servo system. In particular, it is very difficult to accurately acquire transfer characteristics for low-frequency regions in the vicinity of the first-order component of magnetic disk rotation. As a result, SSW cannot apply an appropriate correction to the servo system, and track shape errors can grow with repeated propagation and writing.

SUMMARY

A system and method of writing servo write tracks to a rotating disk using a head having a read/write offset is disclosed. One embodiment utilizes a write element on the head to write the servo write tracks. A read element on the head is then positioned over the servo write tracks. The phase of a specific frequency component of the track shape error in the servo write track is measured during the positioning of the read element over the servo write track. A sine wave having a specific frequency and a phase is selected based on the measurement results. The sine wave is then applied to a servo system as a correction signal. A new servo write track is then written with the write element. For example, the servo write tracks are written using a write element on a head, the read element on the head is moved over the servo write tracks, the phase of a specific frequency component of the track shape error in the servo write track is measured with the read element positioned on the servo track, and a new servo write track is written with the write element while a sine wave having the specific frequency and a phase selected based on the measurement results is applied to the servo system as a correction signal.

DESCRIPTION OF THE DRAWINGS

The accompanying drawings, which are incorporated in and form a part of this specification, illustrate embodiments of the invention and, together with the description, serve to explain an embodiments of the present invention.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, embodiments of the present invention may be practiced without these specific details. In other instances, well known methods, procedures, and components have not been described in detail as not to obscure embodiments of the present invention. Throughout the drawings, like components are denoted by like reference numerals, and repetitive descriptions are omitted for clarity.

Overview

An embodiment of the invention is a method of writing servo write tracks to a rotating disk using a head having a read/write offset. With this method, the servo write tracks are written using a write element on a head, the read element on the head is moved over the servo write tracks, the phase of a specific frequency component of the track shape error in the servo write track is measured with the read element positioned on the servo track, and a new servo write track is written with the write element while a sine wave having the specific frequency and a phase selected based on the measurement results is applied to the servo system as a correction signal. For example, the controller writes new servo write tracks with the write element by applying sinusoidal correction signal to the servo system. The sinusoidal correction signal has the specific frequency and the phase. The phase of the correction signal is chosen by the phase measurement of track shape error of the specific frequency while track following is executed.

In this way, it is possible to reduce the accumulation of track shape errors due to repeated propagation and writing in the self-servo write process which writes servo data to the disk using the head with servo control applied to the head.

The phase of the specific frequency component in the track shape error may be measured with reference to the position error signal obtained by sequentially adding sine waves with different phases at specific frequency to the servo system. In this way, it is possible to determine a suitable phase using a simple method.

The specific frequency may be an integer multiple of the rotational frequency of the disk. In one embodiment, the specific frequency is the frequency of the first-order component of disk rotation. In this way, it is possible to effectively reduce the accumulated errors.

The measurement of the position error signal may be carried out prior to the phase measurement, the phase measurement being carried out where the size of the position error expressed by the position error signal is larger than a threshold. In this way, it is possible to shorten the processing time for servo writing, while appropriately suppressing the accumulated errors.

In one embodiment, the amplitude of the sine wave added to the servo system in the phase measurement is larger than the amplitude of the correction signal. In this way it is possible to carry out accurate phase measurement while avoiding destabilization of the servo system.

Correction based on a model of the servo system may be carried out separately to correction with the sine wave in writing the servo write track. In this way, it is possible to more appropriately prevent the accumulation of errors.

The amplitude of the correction signal may be gradually increased up to the pre-determined value after the phase has been selected. In this way it is possible to avoid rapid changes in the gap between adjacent tracks due to application of a correction signal.

Another embodiment of the invention is a disk drive with a head having a read element and a write element in different positions in the radial direction of the disk, a controller which controls positioning on the head, and an actuator which moves the head over the disk. The controller writes new servo write tracks with the write element by applying sinusoidal correction signal to the servo system. The sinusoidal correction signal has the specific frequency and the phase. The phase of the correction signal is chosen by the phase measurement of track shape error of the said specific frequency while track following is executed.

In this way, it is possible to reduce the accumulation of track shape errors due to repeated propagation and writing in the self-servo write process which writes servo data to the disk using a head with servo control applied to the head.

Further Detail

For convenience sake, omissions and simplifications have been made in the following description and drawings to clarify the explanation. Furthermore, in the drawings, the same elements are keyed with the same symbols, and repeated descriptions have been omitted for the sake of clarity. In what follows, an embodiment of the invention will be described using a hard disk drive (HDD) as an example of a disk drive.

This embodiment relates to writing servo data to a magnetic disk used in an HDD, and more specifically relates to a process of self-propagation writing using servo write tracks written into the magnetic disk as a reference. The characteristic of the embodiment lies in the head positioning control during servo writing. The servo writing of the embodiment is self-servo writing (SSW), with new servo data being written using the head with positioning of the head carried out using servo data read by the head.

The SSW of the embodiment reduces accumulated errors in the shape of servo write tracks by applying a correction signal to the servo system. In this way, it is possible to avoid significant deterioration in the quality of the servo pattern. In particular, the SSW of the embodiment uses a sinusoidal correction signal for servo control. The correction amount Corr (n) can be expressed by $A \times \sin(\omega \times t(n) + \phi)$. $\omega$ is the frequency, t is time the function of sector number n, A is amplitude and φ is the phase. The SSW of the embodiment measures the phase of the specific frequency component in the track shape error, and from the results of measurement determines phase φ of the sinusoidal correction signal A×sin (ω×t (n)+φ) which reduces accumulated errors in the track shape. In this way, it is possible to suppress the accumulation of track shape errors using a simple structure.

One example of the operation of a control electronics mounted on product HDD is described in the following. The similar process can also be carried out using a dedicated servo write control circuit. A description of the overall structure of the HDD which carries out SSW will be given with reference to FIG. 1.

Figure 1:
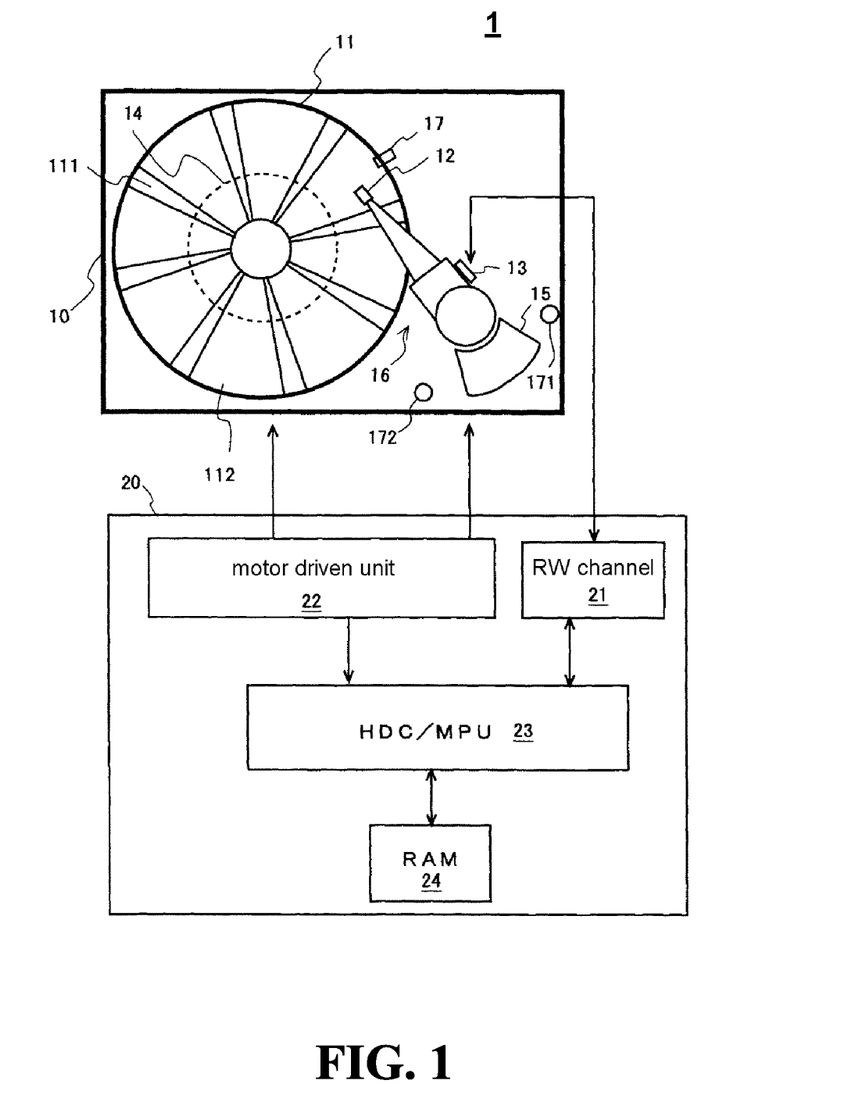
FIG. 1 is a plan view of a hard-disk drive (HDD), in accordance with an embodiment of the present invention.

With reference now to FIG. 1, a plan view of a hard-disk drive (HDD) is shown in accordance with the embodiment. FIG. 1 includes hard disk drive 1, enclosure 10, magnetic disk 11, head slider 12, spindle motor 14, voice coil motor 15, actuator 16, ramp 17, circuit board 20, read/write channel 21, motor drive unit 22, survey data section 113, burst section 114, timing pattern section 115, product servo pattern 117, inner crash stop 171, outer crash stop 172, head element unit 120, write element 121, read element 122 and positioning controller 231.

HDD 1 is provided with circuits such as read/write channel (RW channel) 21, motor spindle unit 22, hard disk controller (HDC) and MPU integrated circuit (HDC/MPU) 23, and semiconductor memory RAM 24 on circuit substrate 20 fixed to the outside of enclosure 10.

Spindle motor (SPM) 14 rotates magnetic disk 11 at a specified angular rotation within enclosure 10. Magnetic disk 11 is a disk that stores data. FIG. 1 shows product servo patterns already written into magnetic disk 11. The recording surface of magnetic disk 11 has a plurality of servo regions 111 formed at specific angles extending in the radial direction from the center of magnetic disk 11.

FIG. 1 shows an example with eight servo areas. Each servo area 111 has a stored servo pattern for controlling the positioning of the head slider when reading/writing user data. The area between two adjacent servo areas 111 is data area 112, which is where user data is stored. Servo area 111 and data area 112 are provided at specific angles relative to one another.

Head slider 12, which is the head, is provided with a slider which floats on magnetic disk 11 and a head element unit which carries out reading/writing of data. Head slider 12 is fixed to the tip of actuator 16. Actuator 16 is a moving mechanism linked to voice coil motor (VCM) 15, and moves head slider 12 in a radial direction above rotating magnetic disk 11 by rotating around a rotational axis.

The range over which actuator 16 can move is limited by inner crash stop 171 and outer crash stop 172 which are provided with elastic bodies. When the power is off or the system is idling, actuator 16 rests on ramp 17. The invention can also be applied to an HDD in which actuator 16 rests on a specific area of the magnetic disk.

Motor driver unit 22 drives SPM 14 and VCM 15 in accordance with control data from HDC/MPU 23. Arm electronic circuit (AE) 13 chooses a head slider to access magnetic disk 11 from a plurality of head sliders 12 in accordance with control data from HDC/MPU 23, and amplifies the read/write signal. RW channel 21 extracts servo data and user data from the read signal obtained from AE 13 in the read process, and carries out a decoding process. The decoded data is supplied to HDC/MPU 23. Moreover, RW channel 21 applies code modulation to the write data supplied from HDC/MPU 23 in the write process, supplying this to AE 13 after conversion of the code-modulated data to a write signal.

In HDC/MPU 23, HDC is a logic circuit, and MPU operates in accordance with the firmware loaded into RAM 24. RAM 24 is loaded with data for the control and data processes. HDC/MPU 23 is an example of a controller, and executes overall control of HDD 1 as well as such processes as head positioning control, interface control, and processes utilized by data management such as defect management. In this embodiment in particular, HDC/MPU 23 controls the execution of self-servo writing.

The SSW of this embodiment is broadly divided into a writing process for the initial pattern and the subsequent process of self-propagation. The self-servo writing process of this embodiment is characterized by this self-propagating process. The self-propagating process positions head slider 12 in the target position by reading out servo write tracks written in previously to magnetic disk 11 by the read element of head slider 12, and writes a new servo write track into the magnetic disk 11 using the write element of head slider 12. Through a repetition of this process, servo tracks are written into the entire recording surface.

As the read element and the write element are in different radial positions, the write element in its different radial position is able to write in a new servo write track with the read element following the servo write track previously written in by the write head. Servo write tracks are tracks written in sequentially in the SSW, and may not match the servo tracks provided as product and used in the servo control for accessing user data. A single product servo track is typically comprised of two continuous servo write tracks.

In the self-propagation process, HDD 1 typically chooses one of a plurality of head sliders 12, and reads out servo data on the recording surface using the selected head slider 12. HDD 1 uses the signal read out by this head slider 12 to control actuator 16, and servo write tracks are written in simultaneously to the recording surfaces using all the head sliders including this head slider.

Figure 2A:
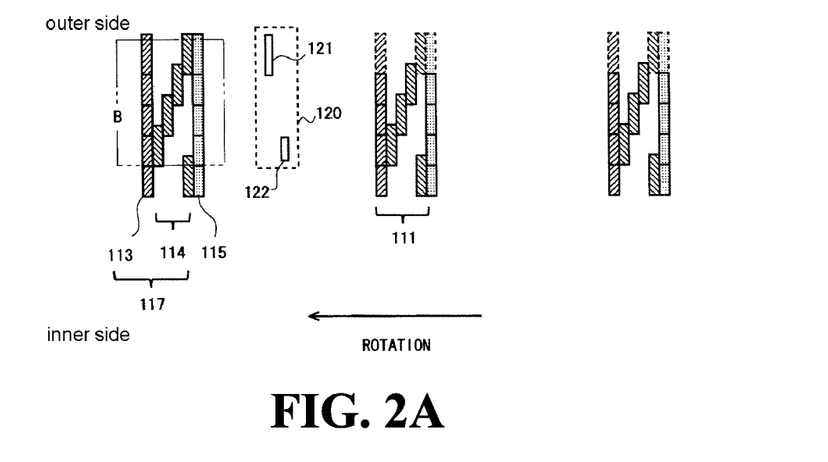
FIG. 2A is an example of pattern layout in accordance with an embodiment of the present invention.

FIG. 2A shows a servo sector on magnetic disk 11 and head element 120 on head slider 12. The rotation of magnetic disk 11 moves from right to left in FIG. 2A. Head element 120 is provided with read element 122 and write element 121. HDD 1 of an embodiment writes patterns continuously from the inner periphery to the outer periphery in the self-propagating process. Depending on the structure of the HDD, the process of writing patterns may proceed from the outer periphery to the inner periphery.

In FIG. 2A, read element 122 is positioned further to the inner side of magnetic disk 11 than write element 121. The gap in the radial direction between write element 121 and the read element is known as the read/write offset. Servo write tracks are written in from the inner periphery to the outer periphery. In this way, the servo pattern written in first by write element 121 can be read out by read element 122. Write element 121 writes in a new servo write track toward the outer periphery while positioning head slider 12 using the servo write track read out by read element 122.

In an embodiment, HDD 1 carries out SSW using a product servo pattern used in processes executed in accordance with commands from the host. Thus, SSW may be carried out using functions supplied in HDD 1 as a product. Similarly, one embodiment writes product servo tracks using servo patterns and timing patterns specific to SSW. In FIG. 2A, the servo pattern used for positioning is product servo pattern 117, comprising servo data section 113 and burst section 114. Moreover, timing pattern 115 which controls timing of the writing of servo data follows on from burst section 114.

Figure 2B:
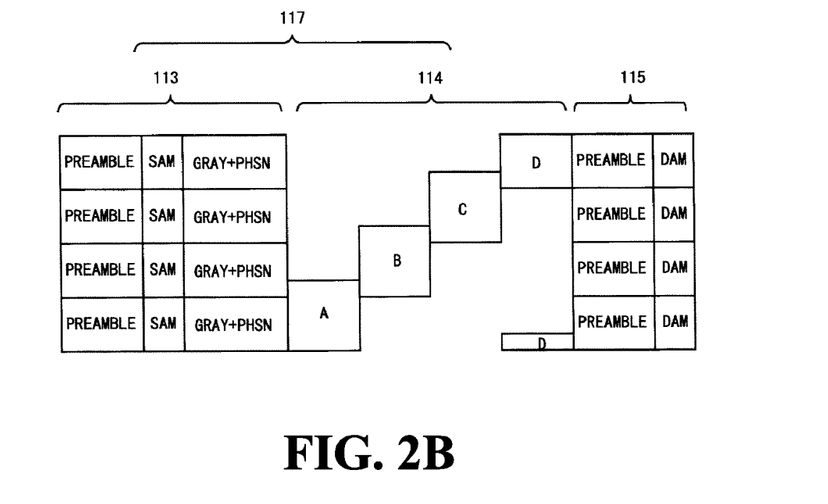
FIG. 2B is an example of the self-servo writing data format as stored in the disk in accordance with an embodiment of the present invention.

FIG. 2B illustrates the pattern format for the parts enclosed by rectangle B in FIG. 2A, showing 4 sectors aligned in the radial direction. Here one sector is comprised of product servo pattern 117 and timing pattern 115. HDD 1 writes in a plurality of sector product servo patterns 117 separated in a single track in the circumferential direction, each sector being written so as to be continuous in a radial direction. The same is true for timing patterns 115.

Servo data section 113 of product servo pattern 117 contains the fields preamble (PREAMBLE), servo address mark (SAM), the track ID comprising a gray code (GRAY) and the servo sector number (PHSN). SAM is the part which indicates where the actual data starts, such as the track ID. Burst section 114 is a pattern indicating a more precise position within the servo track showing the track ID, and is provided with patterns having four different positions in the circumferential direction. Write element 121 writes a single pattern into burst section 114 in a single servo write track. The respective patterns have the width of write element 121, and are positioned offset to one another in the radial direction. Servo data section 113 is written in so as to partly overlap in the radial direction.

In an embodiment, timing pattern section 115 includes the preamble (PREAMBLE) which includes part of a data sector that holds user data, and the data address mark (DAM). HDC/MPU 23 uses the DAM as the timing reference for servo writing. In one embodiment, HDC/MPU 23 may use SAM instead of DAM as the timing reference. In this structure, there is no data sector field.

Thus with SSW, HDD 1 refers to the servo write track written into magnetic disk 11 and uses the temporal and spatial data obtained from this signal to write the next servo write track in a position shifted by the read/write offset in the radial direction while executing temporal control and spatial control. In one embodiment, temporal control refers to timing control in the circumferential direction. In one embodiment, spatial control refers to positional control in the radial direction. The read/write offset varies according to the position of head element unit 120 in the radial direction due to the skew angle.

Thus, in one embodiment, a new servo write track may be formed on the outside while following the servo write track on the inside which acts as a reference. In this way, with the self-propagating process which writes a new servo write track on the outside, the precision in the radial direction of the track acting as the reference on the inside can be carried forward to the newly written track.

To prevent the accumulation of track shape errors with repeated self-propagation in SSW, it is important to prevent track shape error from accumulating by applying correction to the target trajectory. For this reason, HDC/MPU 23 generates a correction signal in accordance with a transfer characteristic model for the servo system, and corrects the input to the feedback controller.

However, if there is a difference between the transmission characteristic model for the servo system and the actual transmission function, precision will deteriorate with propagation. Deterioration in the accuracy of positioning causes a shift from the proper position of the servo pattern, such as a servo write track shape error that may be carried on into the following propagation. Specifically, shifts between burst patterns A, B, C, D is carried on into the next propagation.

Figure 3:
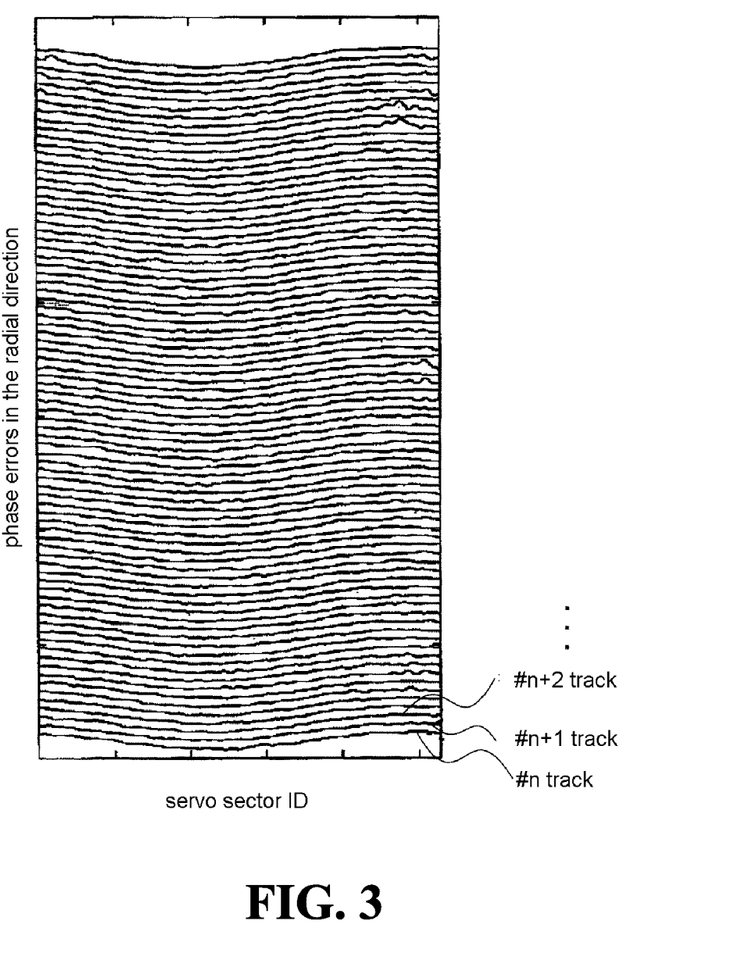
FIG. 3 is an illustration of track shape error accumulation for the first-order harmonics of the disk rotation frequency in accordance with an embodiment of the present invention.

FIG. 3 schematically illustrates the accumulation of track shape errors in the first-order rotation of magnetic disk 11. In low-frequency areas, the servo gain of the servo system is high, and therefore accurate measurement of the transfer characteristics is difficult. For this reason, there is liable to be a significant difference between the actual transfer characteristics and the model in low-frequency areas. In particular, as shown in FIG. 3, shape errors are liable to accumulate for first-order rotation components of magnetic disk 11.

With the SSW of an embodiment, phase measurement of track shape errors is carried out in addition to correcting the control of the positioning of head slider 12 using the modeled transfer function of the servo system, and correction performed using a sine wave correction signal with a phase determined by the measurement results. As described above, the correction amount Corr can be expressed by $A \times \sin(\omega \times t(n) + \phi)$.

To correct for cumulative errors in a specific frequency, one embodiment reduces the cumulative error using the sine wave without obtaining accurate loop characteristics as long as the phase which reduces the track shape error can be known. Moreover, one embodiment removes accumulative errors in track shape by repeating the correction with the sine wave on a plurality of servo write tracks even where the amplitude of the sine wave is small.

Thus, one embodiment carries out a correction which suppresses cumulative track shape errors with a pre-determined low-frequency sine wave $A \times \sin(\omega \times t(n) + \phi)$. The frequency of this correction signal may be a low order component of the rotation of magnetic disk 11, and the correction amount Corr (n) is expressed by $A \times \sin(n \times k \times 2\pi/N + \phi)$. k is a natural number expressing the order based on the rotational frequency of the disk, with N being the sector number read out in a single rotation of the disk.

In one preferable embodiment, the frequency of the correction signal is a first order component of the rotation of magnetic disk 11, with the correction amount Corr (n) expressed by $A \times \sin(n \times 2\pi/N + \phi)$. The correction with the sine wave is used simultaneously with a correction using the model of transfer characteristics, and may be used as a supplementary function. Thus, accurate servo writing done more effectively. However, the sinusoidal correction can be applied independently without activating the correction with the modeled transfer characteristics.

The flow of the entire process of SSW in an embodiment will now be described with reference to the flowchart in FIG. 4. SSW generally carries out calibration in the interval of pre-determined number of propagation Calibration involves such processes as adjustment of the target track pitch and measurement of the track pitch that has been written. In one embodiment, SSW measures the size of the frequency component of the correction signal in the position error signal during calibration, and where the threshold is exceeded, measures the phase which reduces the track shape error. The derived phase is used as the phase of correction signal.

In the repeated self-propagation that follows this, SSW corrects the target trajectory using the calculated correction signal. Correction of the target track continues until re-measurement of the track shape error at the next calibration. Where the size of the specific frequency component in the next calibration position is less than the threshold, correction with a sine wave is terminated by SSW, and thereafter a normal self-propagation writing process is carried out. Where the size of the specific frequency component exceeds the threshold, HDC/MPU 23 once again measures the phase, and correction of the target track continues.

A more detailed description will now be given. HDC/MPU 23 commences SSW in accordance with a command from the host. HDC/MPU 23 controls SPM 13 via motor driver unit 22, and starts rotation of disk 11 (S 11). HDC/MPU 23 controls VCM 15 via motor driver unit 22, and moves actuator 16 onto magnetic disk 11 from ramp 17. HDC/MPU 23 moves actuator 16 further towards the inner periphery, pressing actuator 16 against inner crash stop 171 (S 12).

HDC/MPU 23 carries out a start-up operation with actuator 16 pressed up against inner crash stop 171 (S 13). The start-up operation involves writing in the initial pattern to allow the measurement of head characteristics and self-propagation process. When the start-up operation ends, HDC/MPU 23 commences the self-propagation process (S 14).

When head slider 12 reaches the outer periphery through repetition of self-propagation (Y in S 15), HDC/MPU 23 moves actuator 16 and head slider 12 from above magnetic disk 11 to ramp 17 (S 16). Thereafter HDC/MPU 23 commences rotation of SPM 13 (S 17), and SSW terminates.

HDC/MPU 23 carries out calibration (S 19) when the designated number of servo write tracks have been written in (Y in S 18) before head slider 12 reaches the outer periphery (N in S 15). Timed with this calibration, where the conditions have been satisfied HDC/MPU 23 measures the phase of the track shape error and determines the phase of the correction signal according to the measurement results.

HDC/MPU 23 determines to perform phase measurement of the track shape error where position error for the same frequency component as the frequency of the correction signal is large in PES. The frequency of the correction signal is determined in advance, and in one embodiment is a low-frequency synchronous with the disk rotation. This frequency may be a frequency having a second order or lower component of the disk rotation, and may be the frequency of the first-order component. In one embodiment, the correction signal used has the same frequency as the first-order component of the disk rotation.

HDC/MPU 23 compares the first-order component of the disk rotation and the threshold with reference to PES (S 20). The value to represent the magnitude of the first-order component of disk rotation can be the mean value or the variation of amplitude. Where the size of the first-order component is less than the threshold (N in S 20), HDC/MPU 23 disables the correction function without carrying out measurement of the phase of the track shape error (S 21). Thereafter HDC/MPU 23 continues with self-propagation (S 14).

In one embodiment, after self-propagation has restarted, HDC/MPU 23 slowly increases amplitude A for correction amount Corr (n) expressed by A×sin (n×2π/N+φ) up to a pre-determined value. In practical terms, HDC/MPU 23 increases amplitude A when shifting to the target. Preferably Amplitude A may be increased by the same amount for each step. This prevents rapid changes in the pitch between adjacent tracks due to the application of a correction signal and avoids degradation of the pattern quality.

Where the size of the first-order component is greater than the threshold (N in S 20), HDC/MP 23 measures the phase of the track shape error and determines the phase of the correction signal (S 22). HDC/MPU 23 enables the correction function with the determined correction signal, and recommences self-propagation (S 14).

Thereby the process time for SSW can be reduced by performing the track shape error measurement only when the position error for the correction frequency is large. Moreover, the stability of servo system can be enhanced by activating the correction only when the position error for the correction frequency is large. As another embodiment HDC/MPU 23 may enable the correction function regardless of the magnitude of the position error.

With the above structure, the threshold for enabling the correction function and carrying out measurement of the phase and the threshold for disabling the correction function and skipping phase measurement are the same. These thresholds may also have different values. For example, the threshold enabling the correction function and carrying out phase measurement may be larger than the threshold for disabling the correction function and skipping phase measurement. In so doing, the processing time for SSW is reduced. Depending on the design, HDC/MPU 23 may carry out these processes at a timing of its own, different to that of calibration or another process.

Figure 5:
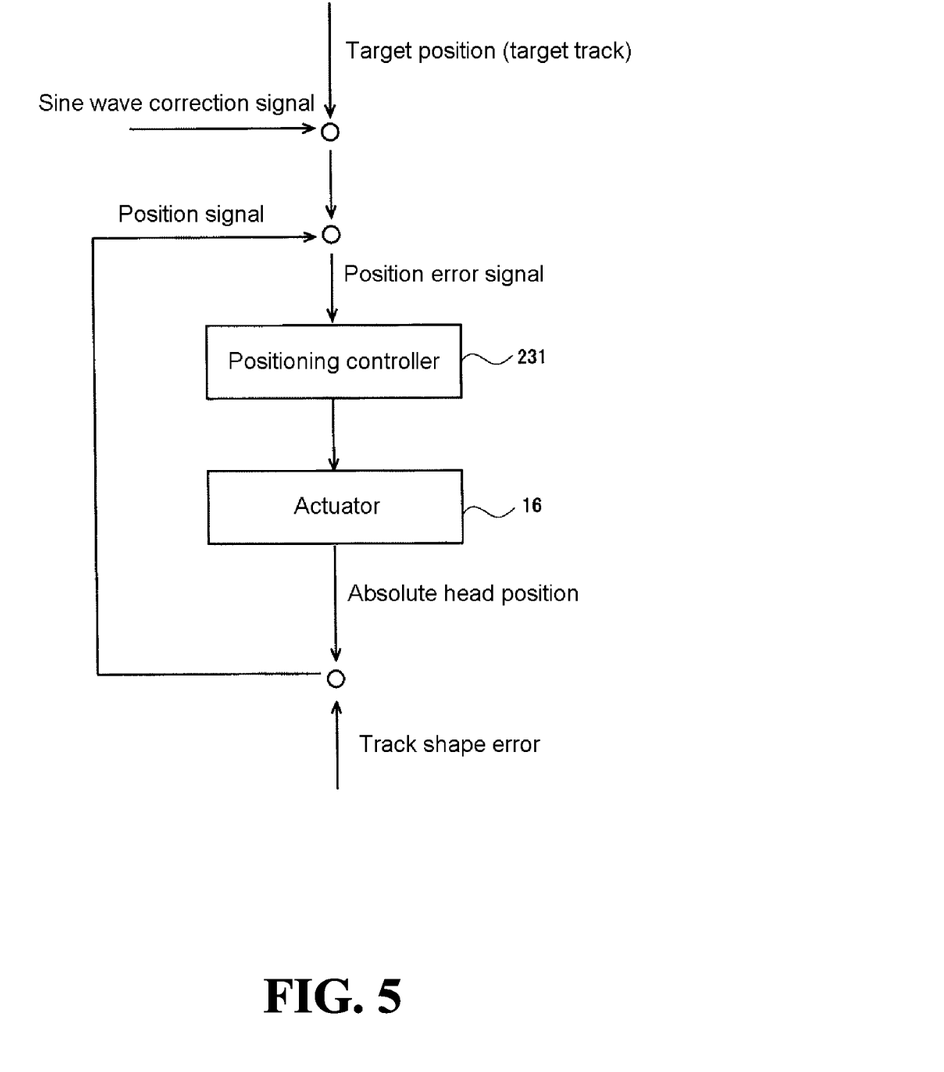
FIG. 5 is a block diagram of the servo system in the self-servo writing process in accordance with an embodiment of the present invention.

FIG. 5 is a block diagram schematically illustrating the structure of the servo system in an embodiment. FIG. 5 illustrates correction with a single frequency correction signal, and does not show correction using the modeled transfer characteristics. Positioning controller 231 generates drive data, such as data showing the VCM current, for actuator 16 in accordance with the position error signal.

Actuator 16 and head slider 12 are positioned under the control of positioning controller 231. Positioning controller 231 is a function of HDC/MPU 23. The position signal read out by the read element 122 of head slider 12 is the subtraction of track shape error from the actual position on the disk. In an actual system, disturbance and noise to actuator 16 are added into the system position signal, but these are omitted in FIG. 5.

HDC/MPU 23 adds a track shape error correction signal to the target position. Thus the difference between the corrected target position and the current head position signal is the position error signal (PES). Positioning controller 231 generates positioning control data for actuator 16 (VCM 15) in accordance with the position error signal, and sends this to motor driver unit 22. Motor driver unit 22 drives actuator 16 (VCM 15) in accordance with this control data.

In the example of the structure shown in FIG. 5, HDC/MPU 23 corrects the target position with the track shape error correction signal. In so doing, one embodiment prevents accumulation of track shape errors by correcting the input to positioning controller 231.

The track shape error signal is a signal with a single frequency and can be expressed by $A \sin(\omega t+\phi)$. In one embodiment, amplitude A and frequency ω are predetermined values. In this way, one embodiment suppresses the accumulation of track shape errors using a simple process. Moreover, in one embodiment, frequency w is an integer multiple of the rotational frequency of magnetic disk 11, and in one embodiment, the value is the rotational frequency of disk 11.

Figure 4:
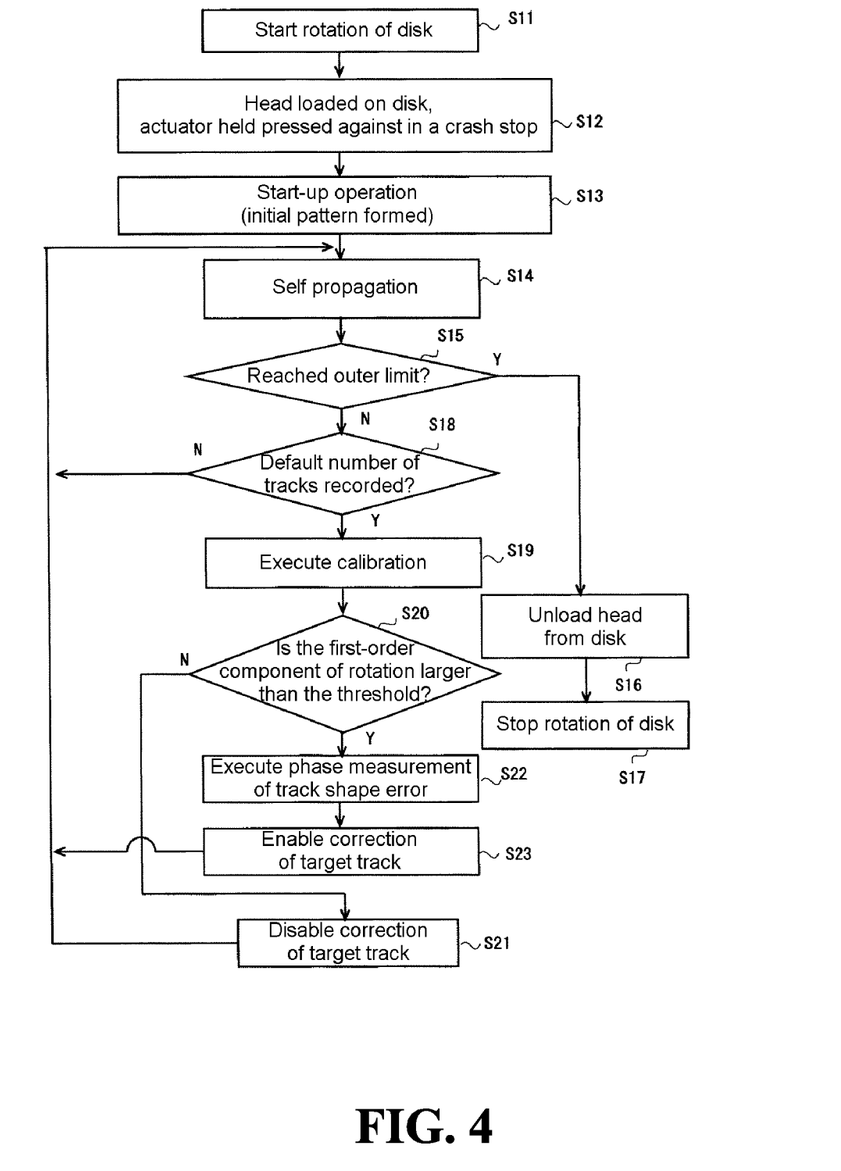
FIG. 4 is a flow chart of the overall process of self-servo writing in accordance with an embodiment of the present invention.

HDC/MPU 23 measures the track shape error, and determines phase φ of correction signal A×sin (ω×t (n)+φ), e.g., process S 22 in FIG. 4. HDC/MPU 23 determines the track shape error by measuring the position error signal, adding a sine wave with the same frequency as correction signal A×sin (ω×t (n)+φ) to the servo system. More specifically, HDC/MPU 23 sequentially adds a plurality of sine waves with different phases to the servo system, and measures the position error signal corresponding to the respective sine waves. The sine wave which gives the smallest position error is the correction signal which produces the smallest track shape error. In other words, phase φ at this time has the reversed phase of the track shape error.

The signal for measuring track shape error is expressed by B×sin (ω×t (n)+φ_k). φ_k is a variable. The purpose of correction signal A×sin (ω×t (n)+φ) is the suppression of the accumulation of shape errors, and does not directly have as its purpose the correction of errors in the current servo write track. In so doing, one embodiment effectively removes the accumulation of shape errors by repeated application of a sine wave with a reverse phase to the shape error even where amplitude A has a small value.

On the other hand, it is important that the effect of sine wave correction signal B×sin (ω×t (n)+φ_k) in the measurement of track shape errors should be significantly recognized.

Moreover, with track shape error measurement, as the open loop gain of the servo system is extremely large in the region in the vicinity of the disk rotational frequency where the correction is applied. In one embodiment, the amplitude B of track shape error measurement signal B×sin ($\omega$×t (n)+$\phi$_k) may be greater than the amplitude A of correction signal A×sin ($\omega$×t (n)+$\phi$) during self-propagation. For example, amplitude B may be around 10 times that of amplitude A.

Figure 6:
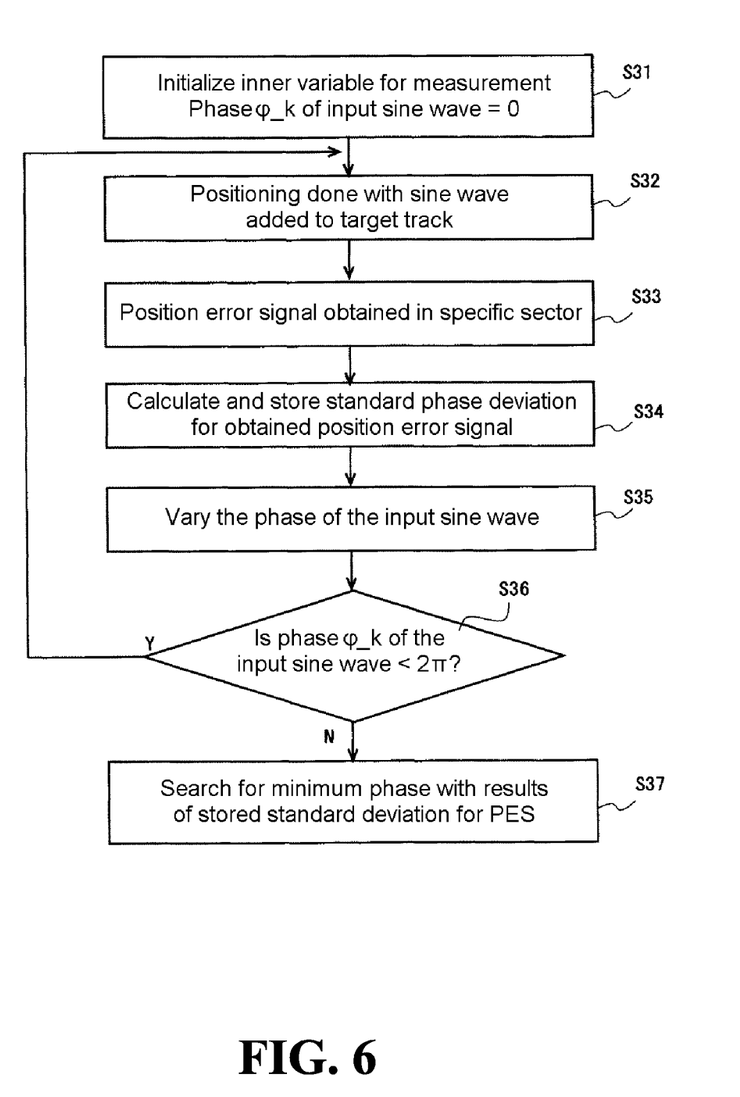
FIG. 6 is a flow chart of the phase-determining process for the correction signal in the self-write process in accordance with an embodiment of the present invention.

The method how to determine the phase of the correction signal A×sin ($\omega$×t (n)+$\phi$) in self-propagation will now be explained in detail with reference to the flowchart in FIG. 6. HDC/MPU 23 initializes the internal variable for measurement of the phase of the track shape error. HDC/MPU 23 sets $\phi$_k to 0 where is the phase of input sine wave×sin ($\omega$×t (n)+$\phi$_k) (S 31). HDC/MPU 23 controls actuator 16 and head slider 12 under the injection of the measurement sine wave to the target trajectory as shown in FIG. 3 (S 32).

HDC/MPU 23 obtains the position error signal in the specified period while controlling the positioning of actuator 16 (S 33). HDC/MPU 23 calculates the variation in the obtained position error signal, typically represented by standard deviation, and stores this (S 34). HDC/MPU 23 shifts phase $\phi$_k of input sine wave B×sin ($\omega$×t (n)+$\phi$_k) by just $\Delta\phi$ (S 35).

Until phase $\phi$_k of input sine wave B×sin ($\omega$×t (n)+$\phi$_k) reaches 2$\pi$, (Y in S 36), HDC/MPU 23 repeats the above processes S 32-S 35. In other words, one embodiment obtains a position error signal (S 33), calculates the standard deviation (S 34) and varies phase $\phi$_k by $\Delta\phi$ (S 35). When phase $\phi$_k of input sine wave B×sin ($\omega$×t (n)+$\phi$_k) reaches 2$\pi$, (N in S 36), HDC/MPU 23 refers to the stored standard deviation and determines a suitable phase $\phi$_k (S 37). HDC/MPU 23 selects phase $\phi$_k with the minimum standard deviation, and sets the phase of the sine wave correction signal to this. This is the optimal phase for reducing track shape errors.

The structure shown in FIG. 5 illustrates a configuration where the sine wave correction signal is added to the target position for positioning control, but as another form of implementation HDC/MPU 23 may add a track shape error correction signal to the output of positioning controller 231. Thus, one embodiment achieves the same effect as for the configuration shown in FIG. 5 with a configuration where the track shape error measurement input signal added when phase measurement takes place is also added to the output of controller 231.

Figure 7:
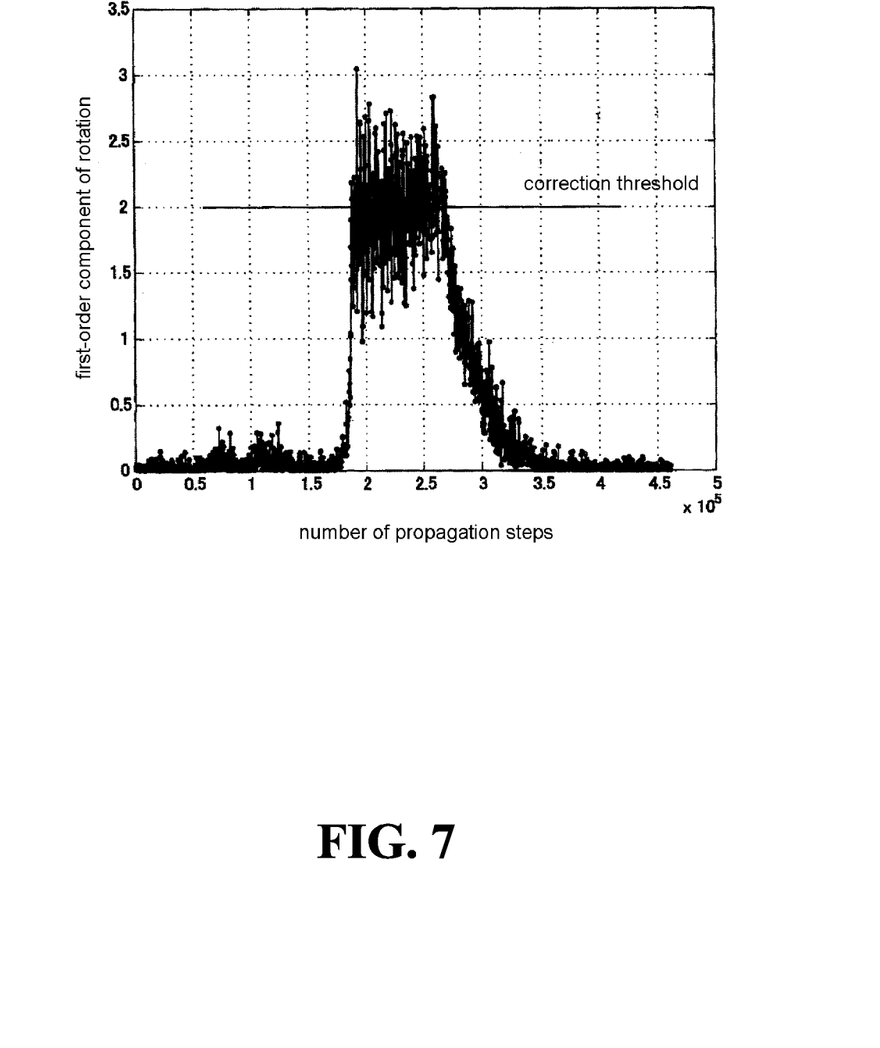
FIG. 7 is a graph illustrating the magnitude of track shape error taken for an actual HDD with the invented error correction method in accordance with an embodiment of the present invention.

FIG. 7 illustrates the magnitude change of the track shape error where the correction method of the invention is applied to a first-order component of disk rotation in an actual HDD. Even when the magnitude of the track shape errors increases through the repetition of self-propagation, the magnitude is kept within the threshold level where the correction of the invention goes active. This result illustrates the effectiveness of the method of the invention.

The foregoing descriptions of specific embodiments of the present invention have been presented for purposes of illustration and description. They are not intended to be exhaustive or to limit the invention to the precise forms disclosed, and many modifications and variations are possible in light of the above teaching. An embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of writing servo write tracks to a rotating disk using a head having a read/write offset, the method comprising:
    writing the servo write tracks using a write element on the head;
    positioning a read element on the head over the servo write tracks;
    measuring the phase of a specific frequency component of the track shape error in the servo write track during the positioning the read element over the servo write track;
    selecting a sine wave having a specific frequency and a phase based on the measurement results;
    applying the sine wave to a servo system as a correction signal;
    writing a new servo write track with the write element; and
    measuring a phase of the specific frequency component of the track shape error with reference to a position error signal obtained by sequentially adding sine waves with different phases at specific frequency to the servo system.

2. The method of claim 1 wherein the amplitude of the sine wave added to the servo system in the phase measurement is larger than the amplitude of the correction signal.

3. The method of claim 1 wherein the specific frequency is an integer multiple of the rotational frequency of the disk.

4. The method of claim 3 wherein the specific frequency is the frequency of the first-order component of the disk rotation.

5. The method of claim 1 further comprising:
    performing the measurement of the position error signal prior to measuring the phase, wherein the phase measurement is carried out where the size of the position error expressed by the position error signal is larger than a threshold.

6. The method of claim 1 further comprising:
    performing the correction based on a model of the servo system separately from the correction with the sine wave in writing the servo write track.

7. The method of claim 1 further comprising:
    gradually increasing the amplitude of the correction signal up to the default value after the phase has been selected.

8. A hard disk drive which writes servo write tracks to a rotating disk, said hard disk drive comprising:
    a head having a read element and a write element thereon, said head configured to write servo write tracks on said disk;
    a moving mechanism which moves the head over the disk having servo write tracks thereon; and
    a controller which controls positioning of the head, said controller configured to measure a phase of a specific frequency component in a track shape error of the servo write track while positioning the read element on the servo tracks, and further configured to supply a sine wave having a specific frequency and a phase selected based on the measurement results to a servo system as a correction signal, said correction signal utilized for writing a new servo write track, wherein the controller is configured to measure the phase in the specific frequency component in the track shape error with reference to the position error signal obtained by adding sine waves with different phases of the specific frequency to the servo system.

9. The disk drive in claim 8 wherein the amplitude of the sine wave added to the servo system in the phase measurement is larger than the amplitude of the correction signal.

10. The disk drive in claim 8 wherein the specific frequency is an integer multiple of the rotational frequency of the disk.

11. The disk drive in claim 10 wherein the specific frequency is the frequency of a first-order component of the rotation of the disk.

12. The disk drive in claim 8 wherein the controller is configured to measure the position error signal before measuring the phase and perform the phase measurement when the size of the position error expressed by the phase error signal is larger than a threshold.

13. The disk drive in claim 8 wherein the correction is carried out based on a model of the servo system separately to the correction with the sine wave in writing servo write tracks.

14. The disk drive in claim 8 wherein the controller gradually increases the amplitude of the correction signal up to the existing value after selecting the phase.

* * * * *